(12) United States Patent
Maruyama et al.

(10) Patent No.: US 7,211,219 B2
(45) Date of Patent: May 1, 2007

(54) OIL-IMPREGNANT SINTERED BEARING AND MANUFACTURING METHOD THEREOF, AND MOTOR

(75) Inventors: Tsuneo Maruyama, Niigata (JP); Junichi Iguchi, Niigata (JP); Kenji Nishio, Kosai (JP); Tooru Itoh, Kosai (JP); Takeshi Tanaka, Kosai (JP)

(73) Assignees: Mitsubishi Materials PMG Corporation, Tokyo (JP); ASMO Co., Ltd., Kosai-shi (JP)

( * ) Notice: Subject to any disclaimer, the term of this patent is extended or adjusted under 35 U.S.C. 154(b) by 0 days.

(21) Appl. No.: 10/441,005

(22) Filed: May 20, 2003

(65) Prior Publication Data
US 2003/0206670 A1    Nov. 6, 2003

Related U.S. Application Data

(62) Division of application No. 09/923,356, filed on Aug. 8, 2001, now Pat. No. 6,599,018.

(30) Foreign Application Priority Data

Aug. 9, 2000  (JP) ............................ 2000-241618
Jul. 24, 2001  (JP) ............................ 2001-222858

(51) Int. Cl.
*B22F 3/02* (2006.01)
*B22F 3/12* (2006.01)
(52) U.S. Cl. ............................ 419/38; 419/2
(58) Field of Classification Search ................ 419/2, 419/28, 5, 38
See application file for complete search history.

(56) References Cited

U.S. PATENT DOCUMENTS

| | | | |
|---|---|---|---|
| 2,615,766 A | 10/1952 | Wallace | |
| 2,625,452 A | 1/1953 | Haller | |
| 2,763,519 A | 9/1956 | Thompson | |
| 2,864,792 A | 12/1958 | Groote et al. | |
| 2,894,792 A | 7/1959 | Brilli | |
| 3,140,131 A | 7/1964 | Tann | |
| 3,445,148 A | 5/1969 | Harris et al. | |

(Continued)

FOREIGN PATENT DOCUMENTS

DE    280149    6/1990

(Continued)

*Primary Examiner*—Roy King
*Assistant Examiner*—Christopher Kessler
(74) *Attorney, Agent, or Firm*—Oblon, Spivak, McClelland, Maier & Neustadt, P.C.

(57) ABSTRACT

The present invention is for providing an oil-impregnant sintered bearing, which can reliably preserve an oil film on a sliding face, and a method for manufacturing the oil-impregnant sintered bearing. An oil-impregnant sintered bearing is made by providing an internal diameter, which a rotating axis member is inserted through, in a bearing main body, formed by a porous sintered alloy having internal pores therein, and providing a sliding face in one region of the inner peripheral face of the internal diameter, the sliding face being obtained by closing the pores which have been opened in the inner peripheral face. The density in a section preserving oil pressure, which extends from the sliding face of the bearing main body toward the outer side of the diameter, is made higher than the density in other sections of the bearing main body.

10 Claims, 5 Drawing Sheets

U.S. PATENT DOCUMENTS

| | | | |
|---|---|---|---|
| 3,580,106 A | | 5/1971 | Wiehl et al. |
| 4,026,657 A | * | 5/1977 | Chmura .................. 403/122 |
| 4,059,879 A | * | 11/1977 | Chmura et al. ............ 384/513 |
| 4,608,085 A | * | 8/1986 | Eudier et al. ................ 75/247 |
| 4,830,820 A | * | 5/1989 | Itoh et al. .................... 419/23 |
| 5,120,091 A | * | 6/1992 | Nakagawa ................ 384/279 |
| 5,282,688 A | | 2/1994 | Kanezaki et al. |
| 5,433,294 A | | 7/1995 | Walker |
| 5,529,401 A | | 6/1996 | Gabelli et al. |
| 5,540,883 A | * | 7/1996 | Jones et al. .................. 419/28 |
| 6,023,114 A | * | 2/2000 | Mori et al. .................. 310/90 |
| 6,082,903 A | | 7/2000 | Saneshige |
| 6,120,188 A | * | 9/2000 | Fujinaka et al. ............ 384/279 |
| 6,225,265 B1 | | 5/2001 | Shibuya et al. |
| 6,270,259 B1 | * | 8/2001 | Burton ...................... 384/213 |
| 6,338,747 B1 | * | 1/2002 | Kosco ........................ 75/243 |
| 6,361,737 B1 | * | 3/2002 | Miyasaka et al. .............. 419/2 |
| 6,505,971 B2 | * | 1/2003 | Sugimoto et al. .......... 384/279 |
| 6,599,018 B2 | * | 7/2003 | Maruyama et al. ......... 384/279 |
| 2004/0136858 A1 | * | 7/2004 | Woolf ........................ 419/28 |

FOREIGN PATENT DOCUMENTS

| | | |
|---|---|---|
| EP | 0 097 027 | 12/1983 |
| JP | 4-307111 | 10/1992 |
| JP | 5-180229 | 7/1993 |
| JP | 8-28567 | 2/1996 |

\* cited by examiner

BACKGROUND ART

FIG. 4A

BACKGROUND ART

OIL-IMPREGNANT SINTERED BEARING AND MANUFACTURING METHOD THEREOF, AND MOTOR

BACKGROUND OF THE INVENTION

1. Field of the Invention

The present invention relates to an oil-impregnant sintered bearing in which a bearing main body is impregnated with lubricating oil for improving lubrication with a rotating axis member which runs through an internal diameter of the bearing, and the manufacturing method thereof.

2. Related Art

An oil-impregnant sintered bearing is composed of a porous sintered metal, and is impregnated with lubricating oil prior to use. Consequently, the oil-impregnant sintered bearing can be used for a long period of time without being further oiled, has superior durability at high temperatures and low noise levels. For these reasons, it is widely used instead of a ball-bearing as a bearing for a rotating axis member.

This type of oil-impregnant sintered bearing comprises a cylindrical bearing main body of porous sintered metal, which an internal face is provided therein. A rotating axis member has a smaller diameter than the diameter of the internal face, and is inserted therein. Lubricating oil, which is sucked out from the great number of small pores which are buried in the bearing main body or opened in the surface of the internal face by the pump action accompanying the rotation of the rotating axis member, and a lubricating oil, which has been exuded by expansion caused by frictional heating, form an oil film at the section of the oil-impregnant sintered bearing which slides against the rotating axis member; this oil film supports the rotating axis member and protects it from damage such as burning.

However, in such an oil-impregnant sintered bearing, since even the sliding face, which the rotating axis member contacts while sliding, has a great number of pores which the lubricating oil is impregnated in, even when the oil film is formed between the rotating axis member and the sliding face, some of the lubricating oil leaks from the pores, reducing the oil pressure and allowing local contact between the rotating axis member and the sliding face. As a consequence, there are drawbacks in that the frictional coefficient with the rotating axis member increases, and burns on the like may occur.

Figure 4A:
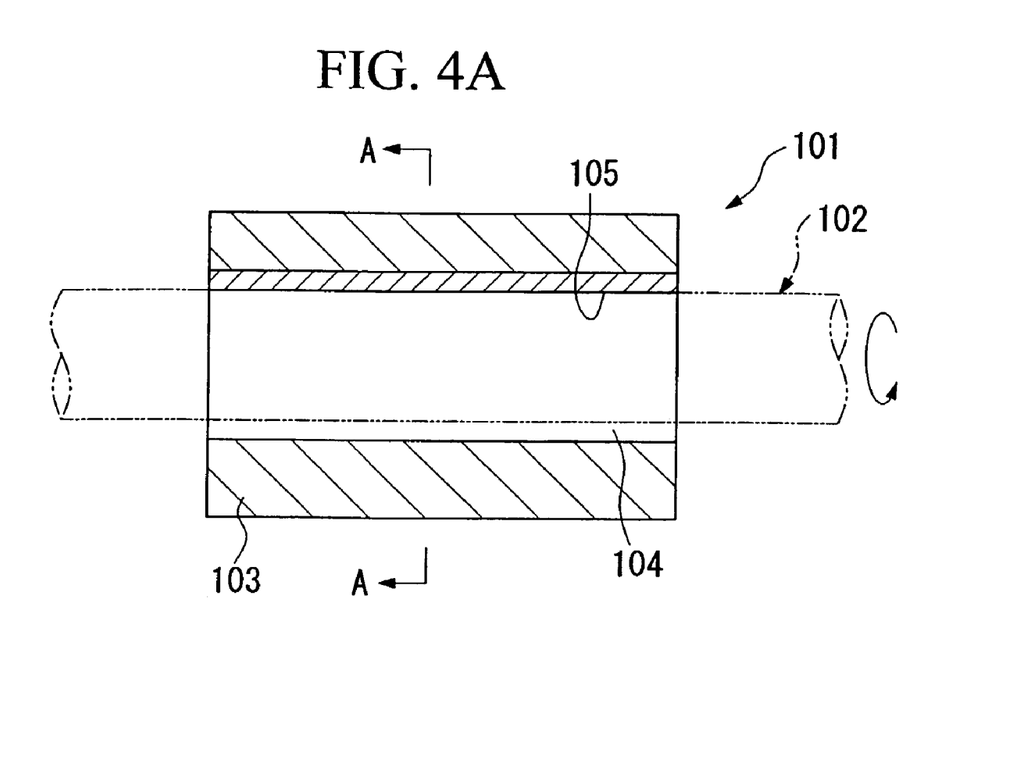
FIG. 4A is a front cross-sectional view of a conventional oil-impregnant sintered bearing.
Figure 4B:
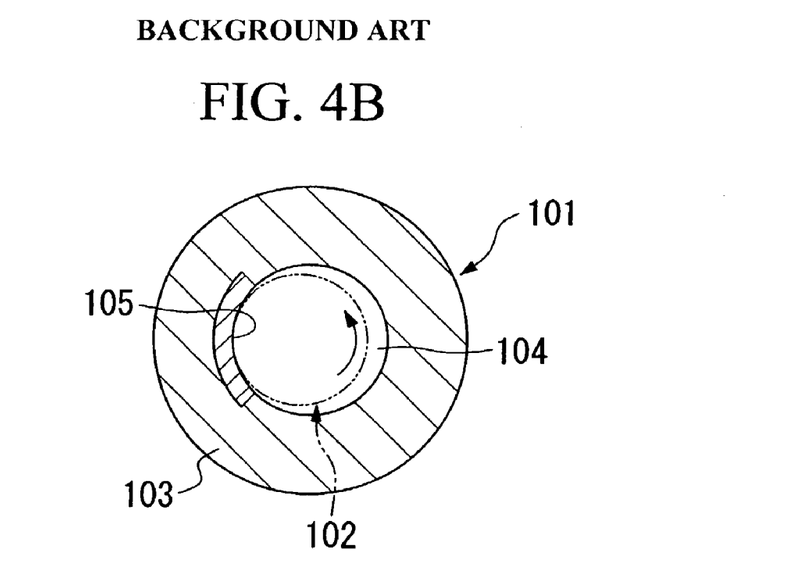
FIG. 4B is a sectional view taken substantially along the line A—A of a conventional oil-impregnant sintered bearing.

An oil-impregnant sintered bearing 101 shown in FIG. 4 is a conventional proposal for dealing with these drawbacks. The oil-impregnant sintered bearing 101 having an internal diameter 104, which is provided in a bearing main body 103 of porous sintered alloy having internal pores, and a rotating axis member 102, which is inserted through the internal diameter 104. A sliding face 105 is provided by closing pores in one region in the periphery direction on the inner peripheral face of the internal diameter 104. This method for preserving the oil film stops the lubricating oil from leaking when the sliding face 105 contacts the rotating axis member 102, and prevents the reduction in oil pressure mentioned above.

However, as for the example disclosed in Japanese Patent Application, First Publication No. 4-307111, even when pores are closed in the inner peripheral face of a pressed powder body, obtained by pressure-forming of raw material powder, the pores sometimes re-open during sintering since tin and the like is included in the raw material powder. Consequently, oil seeps from the holes to the inside, and oil pressure decreases. Further, Japanese Patent Application, First Publication No. 5-180229 discloses technology for closing the pores in the inner peripheral face when plugging in a rod for forming the bearing at the time of post-sintering correction. However, this technology basically involves closing the pores which have appeared in the inner face, and cannot preserve the oil film since the surface layer may be broken by the oil pressure, allowing the oil to seep to the inside.

Further, Japanese Patent Application, First publication No. 8-28567 discloses technology which uses a welded material having no pores in one section of its inner peripheral face. However, since the welded material cannot contain lubricating oil, the capacity of lubricating oil which can be contained in the oil-impregnant sintered bearing is reduced.

SUMMARY OF THE INVENTION

The present invention has been realized in consideration of the above problems, and aims to provide an oil-impregnant sintered bearing which can reliably secure the oil film, formed on the sliding face, and a method for manufacturing the oil-impregnant sintered bearing.

A first aspect of the present invention provides an oil-impregnant sintered bearing comprising an internal diameter, in which a rotating axis member is inserted therethrough, provided in a bearing main body, formed by a porous sintered alloy having internal pores, and a sliding face, provided in one region of the inner peripheral face of the internal diameter. The sliding face is obtained by closing the pores which have been opened in the inner peripheral face. The density in a section preserving oil pressure, which extends from the sliding face of the bearing main body toward the outer side of the diameter, is higher than in other sections of the bearing main body.

According to this constitution, the density of the section preserving oil pressure, extending from the sliding face of the bearing main body to the outer side of the diameter, is higher than other sections of the bearing main body. Therefore, the pores in the internal area of the section preserving oil pressure are closed more greatly than the other section, with the result that oil does not seep from the sliding face to the inside, thus enabling the oil film to be secured over the sliding face.

A second aspect of the present invention provides a method for manufacturing the oil-impregnant sintered bearing, comprising the steps of pressure-forming a raw material powder to obtain a pressed powder body, sintering the pressed powder body, obtaining a bearing main body, formed by a porous sintered alloy having internal pores, and providing a sliding face in one region of the inner peripheral face of the internal diameter, the sliding face being provided by closing the pores which have been opened in the inner peripheral face; and making the density in a section preserving oil pressure, which extends from the sliding face of the bearing main body toward the outer side of the diameter, higher than in other sections of the bearing main body.

In this invention, the oil-impregnant sintered bearing is manufactured so that the density of the section preserving oil pressure, extending from the sliding face of the bearing main body to the outer side of the diameter, is higher than other sections of the bearing main body. Therefore, the pores in the internal area of the section preserving oil pressure are more greatly closed than in the other sections, with the result that oil does not seep from the sliding face to the inside, enabling the oil film to be secured over the sliding face.

According to a third aspect of the present invention, in the method of the second aspect, more raw material powder is filled in a part of a cavity for pressure-forming the pressed powder body where the section preserving oil pressure is to be provided than in other parts, and the compression rate of the raw material powder in the part during pressure-forming is made greater than in the other parts, thereby making the density in the section preserving oil pressure higher than in other sections of the bearing main body.

In this invention, in a cavity for pressure-forming a pressed powder body, more raw material powder is filled in a part where the section preserving oil pressure is to be provided than in other parts, and the compression rate of the raw material powder in the part during pressure-forming is greater than in the other parts. Therefore, when the pressed powder body is corrected after sintering to obtain the oil-impregnant sintered bearing, the density in the section preserving oil pressure can be made higher than in other sections of the bearing main body.

According to a fourth aspect of the present invention, in the method of the third aspect, the raw material powder is filled in a cavity comprised of a die for forming an outer peripheral face of the pressed powder body, which is made substantially cylindrical, a round-ended column-like core rod for forming an inner peripheral face, a first lower punch and a second lower punch for forming a bottom end face of the pressed powder body. More raw material powder is filled in a place where the section preserving oil pressure is to be provided, by bringing the first lower punch lower down than the second lower punch. In addition, the raw material powder is enclosed by the first lower punch, the second lower punch, and an upper punch, and is compressed until the first lower punch and the second lower punch are set at the same height, thereby increasing the density in the place on the pressed-powder body where the section preserving oil pressure is to be provided.

In this invention, the raw material powder is filled from above into a cavity comprised of a die for forming an outer peripheral face of the pressed powder body, which is made substantially cylindrical, a round-ended column-like core rod for forming an inner peripheral face, a first lower punch and a second lower punch for forming a bottom end face of the pressed powder body. Since the first lower punch is brought lower down than the second lower punch, more raw material powder is filled in the place where the section preserving oil pressure is to be provided. The first lower punch and the second lower punch are moved upwards in the space enclosed by the die and the core rod, and the upper punch for forming the top face of the pressed powder body is inserted from above into the space enclosed by the die and the core rod and moved downwards, whereby the raw material powder is enclosed and compressed by the first lower punch, the second lower punch, and the upper punch. Since the pressed powder body is made so that the first lower punch and the second lower punch finally become the same height, the raw material powder which is filled above the first lower punch is compressed at a high compression rate. Therefore, when the pressed powder body is corrected after sintering to obtain the oil-impregnant sintered bearing, the density in the section which is filled with more raw material powder is increased, and the internal pores are more greatly closed than in other sections.

In this way, the lower punch is divided in alignment with the place where the section preserving oil pressure will be provided, the first lower punch for forming the section which will become the section preserving oil pressure being brought down lower than the second lower punch. The compression rate of the raw material powder is higher in the section which is enclosed by the first lower punch and the upper punch than in other sections. Therefore, when the pressed powder body is corrected after sintering to obtain the oil-impregnant sintered bearing, the density in the section preserving oil pressure is higher than in other sections of the bearing main body.

According to a fifth aspect of the present invention, in the method of the second aspect, the inside diameter of the inner peripheral face of the pressed powder body, which is made substantially cylindrical, is made smaller in a region where the sliding face will be provided than in other regions, and the region where the sliding face will be provided is extended toward the outer side of the diameter during correction to obtain the internal diameter, thereby compressing the section which extends to the outer side of the diameter from the region where the sliding face will be provided, and making the density of the section preserving oil pressure higher than the density in other sections of the bearing main body.

In this invention, the inside diameter of the pressed powder body in the region where the sliding face is to be provided so as to be smaller than in other regions, and, during post-sintering correction, this section is corrected and compressed so as to expand toward the outer side of the diameter. Therefore, the density in the section preserving oil pressure can be made higher than in other sections.

A sixth aspect of this invention provides a motor equipped with a rotator having a rotating axis member which protrudes at one end, the motor comprising a worm, provided around the outer periphery of the protruding rotating axis member; and a worm wheel which meshes with the worm and has a decelerator unit provided to an output axis member protruding at a rotation core of the worm wheel. The protruding rotating axis member of the rotator is inserted into the internal diameter of the oil-impregnant sintered bearing of the first aspect, and the sliding face of the oil-impregnant sintered bearing is provided so as to slidingly contact one part of the outer peripheral face of the rotating axis member which is provided on the opposite side of the axis member line of the rotating axis member to the side which meshes with the worm wheel.

According to the constitution, the oil film, which is provided on the sliding face, is reliably preserved, guaranteeing that the rotating axis member rotates smoothly.

DESCRIPTION OF THE PREFERRED EMBODIMENTS

The oil-impregnant sintered bearing and manufacturing method of the present invention will be explained based on the drawings.

Figure 1:
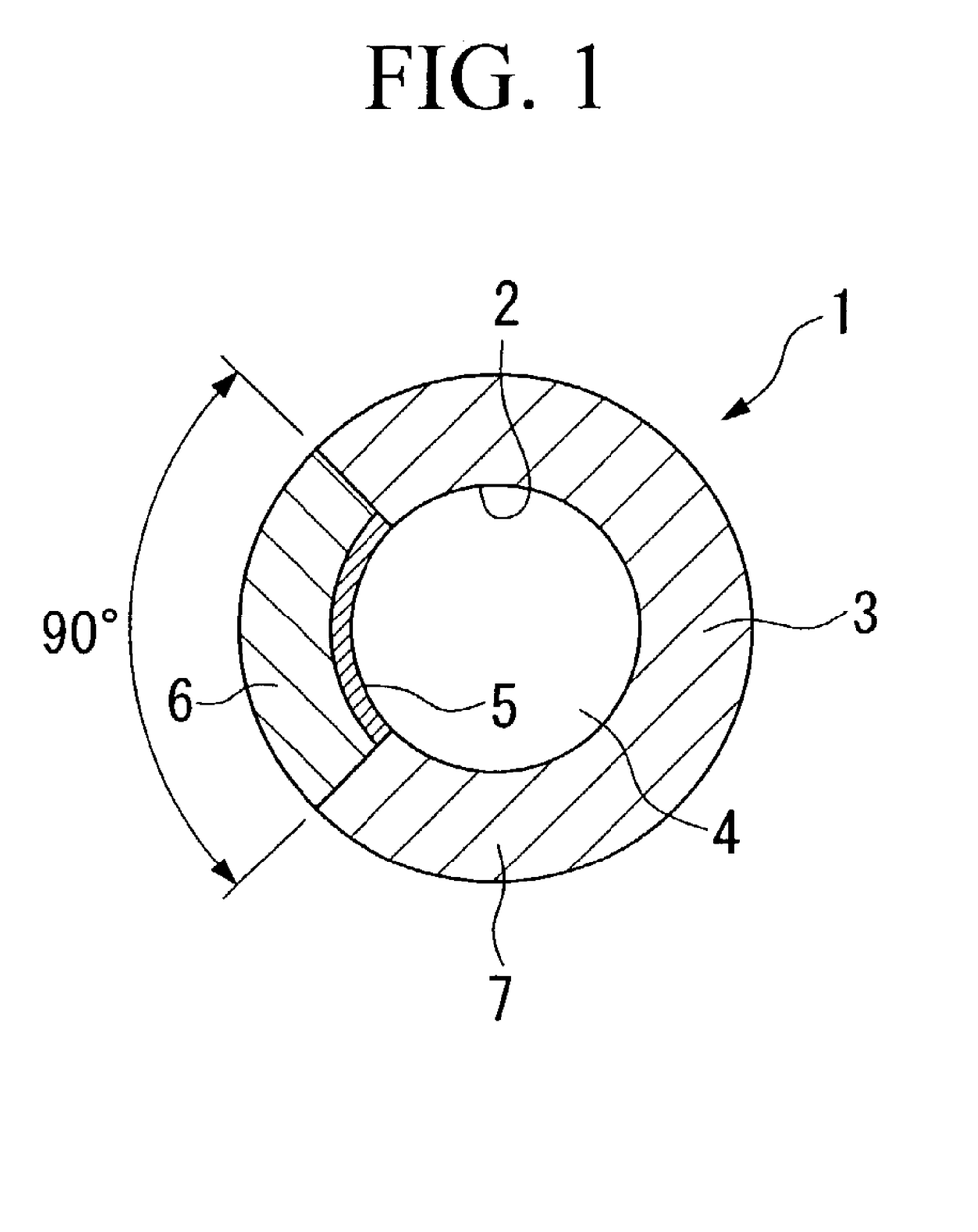
FIG. 1 is a diagram showing an embodiment of this invention, being a view of an oil-impregnant sintered bearing from the axial direction.

FIG. 1 shows an embodiment of the oil-impregnant sintered bearing according to the present invention.

FIG. 1 shows a substantially cylindrical oil-impregnant sintered bearing 1 viewed from the axial direction. The oil-impregnant sintered bearing 1 comprises an internal diameter 4, provided in a bearing main body 3, which comprises a porous sintered alloy having internal pores. An unillustrated rotating axis member has a smaller diameter than the internal diameter 4, and is inserted therein. A sliding face 5 is provided by closing pores, provided in the peripheral face, at one region of the peripheral direction (in this embodiment, the region at a perimeter angle of 90 degrees) in the inner peripheral face 2 of the internal diameter 4. A section preserving oil pressure 6 has a higher density than other sections of the bearing main body 3, and extends from the sliding face 5 of the bearing main body 3 toward the outer side of the diameter. The outer face of the rotating axis member, which is inserted through the internal diameter 4, slidingly contacts the sliding face 5 as it rotates.

More specifically, the pores which contain the lubricating oil are provided in the whole area of the bearing main body 3 along the peripheral direction thereof. As a result, the lubricating oil can be freely moved along the peripheral direction, and therefore, the lubricating oil can diffuse in the whole area without stagnating. Furthermore, the porosity of the section preserving oil pressure 6 becomes relatively low since most of the pores are closed and the average diameter of the holes is decreased. Otherwise, the porosity of the other section 7 of the bearing main body 3 becomes relatively high since most of the pores are not closed and the average diameter of the holes is enlarged.

Next, an embodiment of a method for manufacturing the oil-impregnant sintered bearing 1 having the constitution described above will be explained mainly with reference to FIGS. 2A and 2B. The oil-impregnant sintered bearing 1 is made by pressure-forming a raw material powder to obtain a pressed powder body, which is then sintered and shape-corrected. The section preserving oil pressure 6 is made by filling one section with more raw material powder than the other sections, and compressing it at a high compression rate when pressure-forming the raw material powder.

Figure 2A:
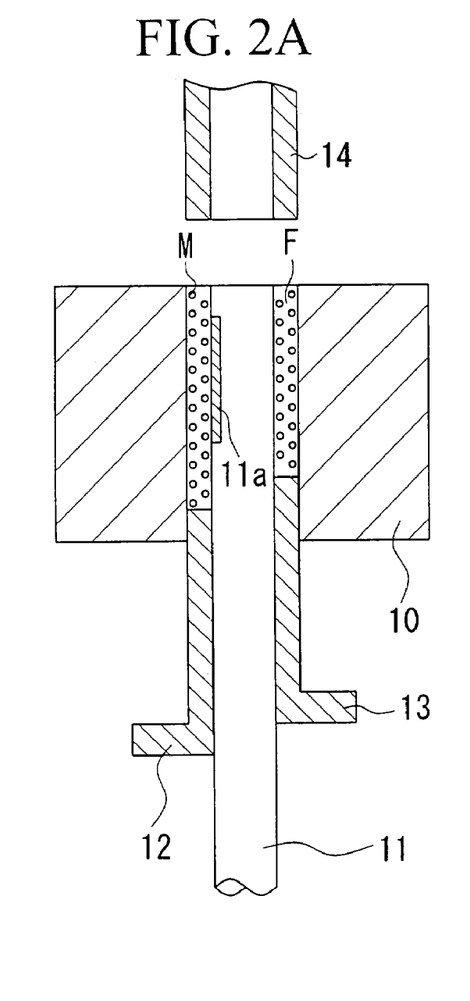
FIG. 2A is a diagram showing an embodiment of this invention, and schematically showing a process of filling a cavity with raw material powder.
Figure 2B:
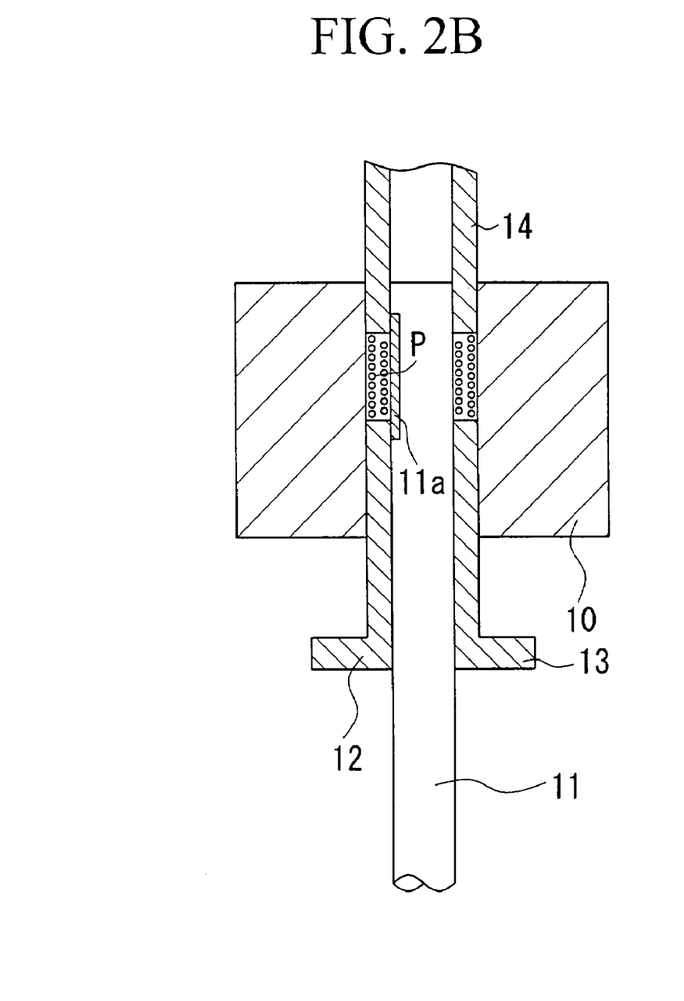
FIG. 2B is a diagram showing an embodiment of this invention, and schematically showing a process of forming the raw material powder.

FIGS. 2A and 2B show a pressed powder body P which has been pressure-formed from a raw material powder M. A cavity F, which is filled with the raw material powder, comprises a cylindrical die 10 for forming the outer peripheral face of the substantially cylindrical pressed powder body P, a round-ended column-like core rod 11 for forming the inner peripheral face, a first lower punch 12 and a second lower punch 13 for forming a bottom end face of the pressed powder body P. The first lower punch 12 and the second lower punch 13 have the shape of a single cylinder which has been divided along its central axis member, and the perimeter angle of the first lower punch 12 is equal to the perimeter angle of the region in which the sliding face 5 is provided. A rough face 11a is provided on the outer peripheral face of the core rod 11. The rough face 11a is band-like in shape and parallel to the central axis member line of the core rod 11; the perimeter angle of the rough face 11a is equal to the perimeter angle of the region in which the sliding face 5 is provided.

As shown in FIG. 2A, initially, the first lower punch 12 is brought down lower than the second lower punch 13. In this state, the cavity F is filled with the raw material powder M through the open top. Since the first lower punch 12 is brought lower down than the second lower punch 13, the area above the first lower punch 12 is filled with more raw material powder M than the area above the second lower punch 13.

The raw material powder M is enclosed and compressed by the first lower punch 12, the second lower punch 13, and the upper punch 14. That is, the first lower punch 12 and the second lower punch 13 are moved upwards toward the die 10 and the core rod 11, and the upper punch 14 is inserted into the space between the die 10 and the core rod 11 and moved downwards therein, whereby the raw material powder M is enclosed and compressed by the first lower punch 12, the second lower punch 13, and the upper punch 14. In this way, as shown in FIG. 2B, the pressed powder body P is compressed until the first lower punch 12 and the second lower punch 13 are finally the same height.

In a subsequent process, when the core rod 11 is pulled out, the rough face 11a, which is provided on the outer peripheral face of the core rod 11, closes the pores in the inner peripheral face of the pressed powder body P and thereby obtains the region which will become the sliding face 5.

Since the compression rate in the section of the raw material powder M which is enclosed and compressed by the first lower punch 12 and the upper punch 14 is higher than the compression rate in the section of the raw material powder M which is enclosed and compressed by the second lower punch 13 and the upper punch 14, the pores in this section are more greatly closed than the other section. When the pressed powder body P in this state is sintered and corrected, achieving the oil-impregnant sintered bearing 1 as shown in FIG. 1, the pores in the section preserving oil pressure 6 are more greatly closed than the other sections, increasing its density.

In the oil-impregnant sintered bearing 1 which has been made in this way, not only the pores on the sliding face 5 but also the pores in the section preserving oil pressure 6 which extend from the sliding face 5 toward the outer side of the diameter are more greatly closed than the other sections. For this reason, even when holes are created in the sliding face 5 due to sintering, since the internal pores are closed, the oil on the sliding face 5 is unlikely to seep into the bearing main body 3.

Therefore, according to the oil-impregnant sintered bearing 1 shown in FIG. 1, the oil film can be reliably secured without reducing the oil pressure on the sliding face 5, and the frictional coefficient with the rotating axis member can be kept low.

Incidentally, in the embodiment described above, the stage of making the pressed powder body P in order to obtain the sliding face 5 comprises a step of closing the pores on the inner peripheral face, but it is acceptable to use a method, disclosed in Japanese Patent Application, First Publication No. 5-180229, of providing a bump protruding to the inner side of the diameter in the region where the sliding face 5 is to be provided, shaving away this bump during correction after sintering, and pressingly-inserting a correction rod, thereby closing the pores on the inner peripheral face and making the sliding face.

In creating the section preserving oil pressure, it is important not only to close the pores on the sliding face, but to close the pores in the section of the bearing main body which extends from the sliding face toward the outer side of the diameter.

Figure 3A:
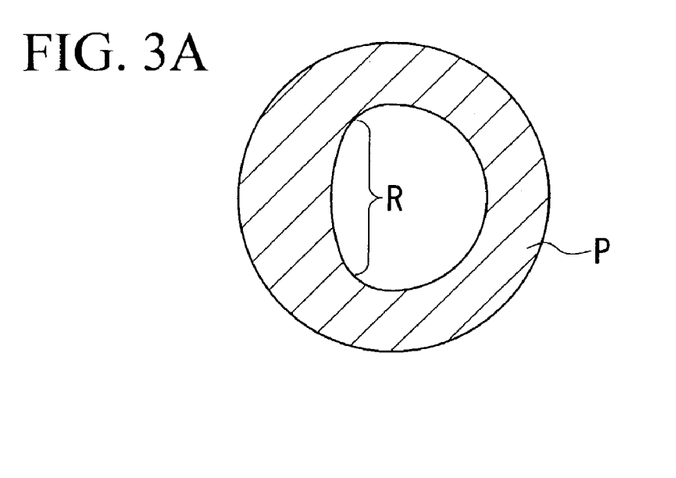
FIG. 3A is a diagram showing the processes of manufacturing the oil-impregnant sintered bearing according to another embodiment of this invention, and showing a pressed powder body after sintering viewed from the axial direction.

Furthermore, a method for manufacturing the oil-impregnant sintered bearing according to another embodiment of the present invention will be explained using FIGS. 3A to 3C. As shown in FIG. 3A, the pressed powder body P is made and sintered so that the inside diameter of the inner peripheral face in the region R where the sliding face is to be provided is smaller than in other regions. More specifically, the inside diameter in the region R is made approximately 0.02 to 0.15 mm smaller.

Figure 3B:
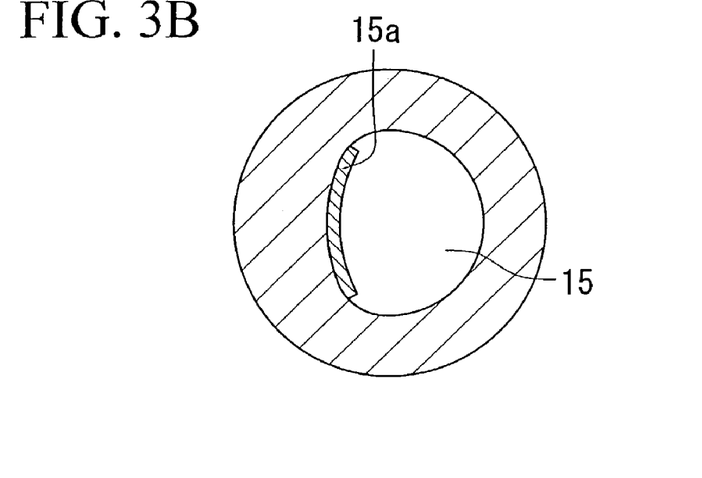
FIG. 3B is a diagram showing processes of manufacturing the oil-impregnant sintered bearing according to another embodiment of this invention, and showing a correction rod inserted into the pressed powder body viewed from the axial direction.
Figure 3C:
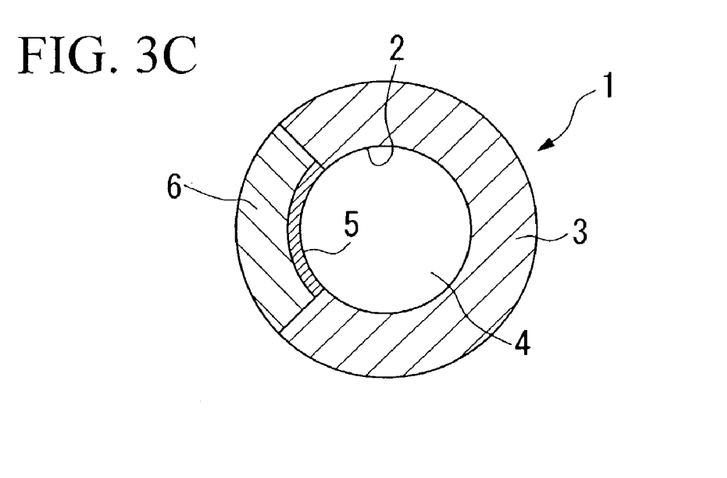
FIG. 3C is a diagram showing processes of manufacturing the oil-impregnant sintered bearing according to another embodiment of this invention, and showing the completed oil-impregnant sintered bearing viewed from the axial direction.

Subsequently, as shown in FIGS. 3B and 3C, this section is corrected and compressed so that the sintered pressed powder body P is extended toward the outer side of the diameter. For example, the correction rod 15 for forming the internal diameter 4 is shaped so that its tip matches the inner peripheral shape of the flat pressed powder body P, and gradually becomes a perfect circular-headed rod further away from the tip. By pressingly-inserting the correction rod 15 having such a shape, the flat inner peripheral face is gradually corrected until it becomes circular, and, as shown in FIG. 3C, the internal diameter 4 is finally created. At this time, a rough face 15a is provided by electric discharge and the like at the section corresponding to the region R of the correction rod 15, closing the pores on the inner peripheral face and finally forming the sliding face 5.

In this way, the pores in the inner section are closed by post-sintering compression of the section which extends from the sliding face 5 toward the outer side of the diameter, and finally the section preserving oil pressure 6 having higher density than the other sections is made.

According to this method, the section preserving oil pressure can be made merely by slightly changing the shape of the correction rod, and there is no need to greatly change the die set.

Figure 5:
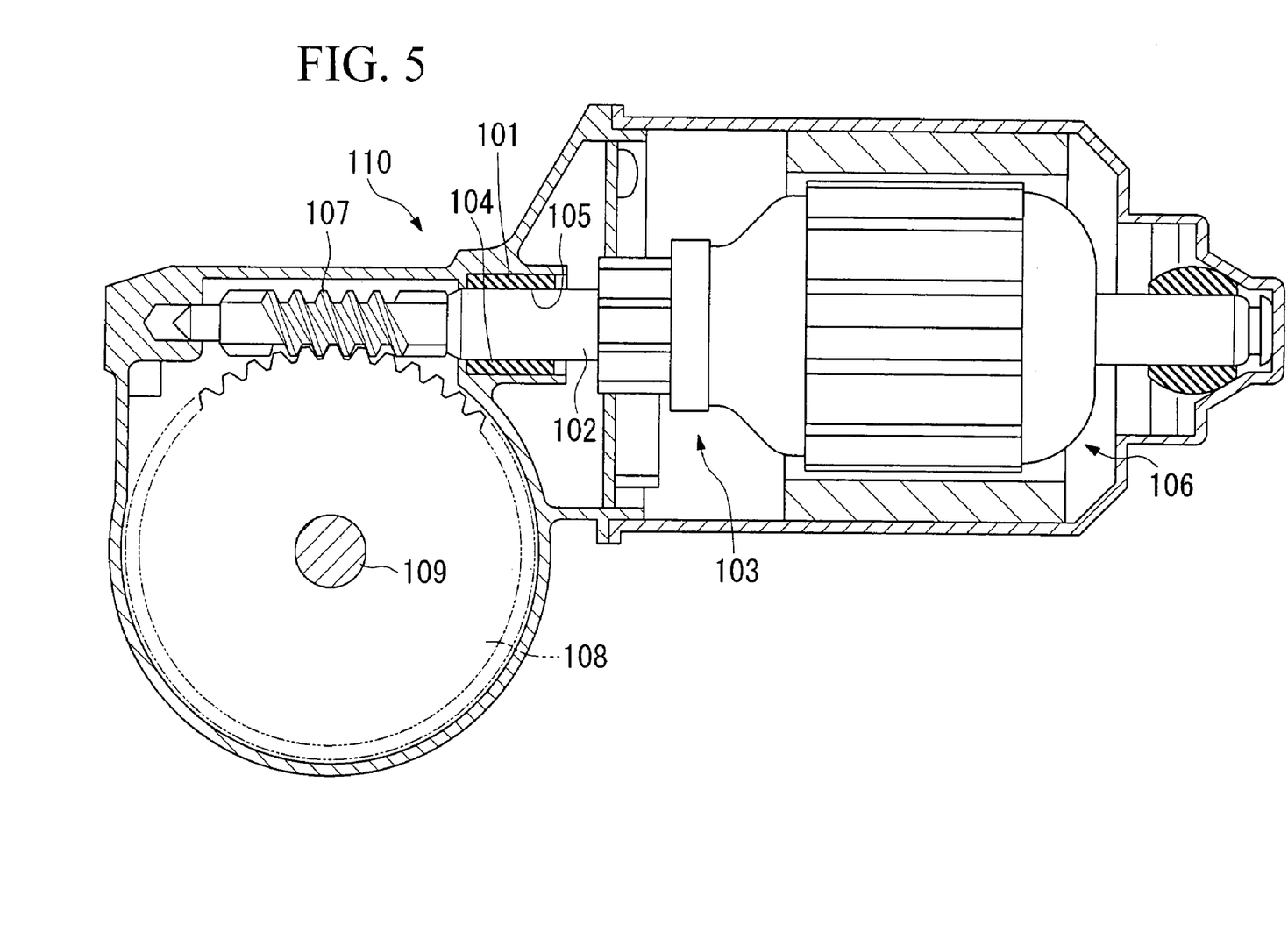
FIG. 5 is a diagram showing the schematic constitution of a motor which uses the oil-impregnant sintered bearing according to the present invention, with one section removed.

The oil-impregnant sintered bearing 1 shown in FIGS. 1 and 3 is used, for example, in a small-scale motor 110 fitted with a decelerator as shown in FIG. 5. The motor 110 comprises a rotator 103, comprising a rotating axis member 102 which is inserted through an armature 106, a worm 107, obtained by providing a spiral-shaped notch in one section of the outer periphery of the tip protruding section of the rotating axis member 102, and a worm wheel 108, which meshes by interlocking with the worm 107. An output axis member 109 protruding in the rotating axis member line direction of the worm wheel 108, and is provided at the rotation core thereof. The output axis member 109 is connected to an unillustrated load (decelerating unit) and decelerates the rotations of the motor 110. The oil-impregnant sintered bearing 101 according to the embodiment of the present invention shown in FIGS. 1 and 3 is provided between the worm 107 and the armature 106, and the rotating axis member 102 is inserted into the internal diameter 104 of the oil-impregnant sintered bearing 101. A sliding face 105 is provided by closing pores, provided in the inner peripheral face of the internal diameter 104, and slidingly contacts one section of the outer peripheral face of the rotating axis member 102 which is on the opposite side of the axis member line of the rotating axis member 102 to the side which the worm wheel 108 meshes with.

According to this constitution, the sliding face 105 supports the load which the worm wheel imposes on the rotating axis member 102. By reliably preserving the oil film, which is provided on the sliding face 105, smooth rotation of the rotating axis member 102 can be guaranteed.

What is claimed is:

1. A method of manufacturing an oil-impregnated bearing, comprising:

pressure-forming a raw material powder to obtain a pressed powder body;

forming a sliding face on an inner peripheral face of the pressed powder body by closing pores which have been opened in the inner peripheral face;

making a density in a section of the pressed powder body preserving oil pressure higher than in an adjacent section of the pressed powder body, the section preserving oil pressure extending from the sliding face toward an outer side of the pressed powder body; and sintering the pressed powder body to provide a bearing main body, wherein, in a cavity for pressure-forming said pressed powder body, more raw material powder is filled in a part where the section preserving oil pressure is to be provided than in an adjacent part, and a compression rate of the raw material powder during pressure-forming is higher than in the adjacent part, thereby making the density in said section preserving oil pressure higher than in an adjacent section of said bearing main body.

2. The method as described in claim 1, wherein said raw material powder is filled in the cavity comprising a die for forming an outer peripheral face of said pressed powder body, which is made substantially cylindrical, a round-ended core rod for forming the inner peripheral face, and a first lower punch and a second lower punch for forming a bottom end face of the pressed powder body, more of said raw material powder is filled where said section preserving oil pressure is to be provided by bringing said first lower punch lower down than said second lower punch, and said raw material powder is enclosed by said first lower punch, said second lower punch, and an upper punch, and compressed until said first lower punch and said second lower punch are set at a same height, increasing the density on said pressed powder body where said section preserving oil pressure is to be provided.

3. A method of manufacturing an oil-impregnated bearing, comprising:

pressing powder to obtain a pressed powder body including a first portion having a first density and a second portion having a second density less than the first density;

forming a sliding face on an inner peripheral face of the first portion by closing pores which have been opened in the inner peripheral face; and sintering the pressed powder body to provide a bearing main body, wherein pressing comprises pressing a first height of powder to form the first portion having the first density and a second height of powder to form the second portion having the second density, the first height being greater than the second height.

4. The method according to claim 3, wherein the first height is compressed with a first bottom die and the second height is compressed with a second bottom die.

5. The method according to claim 4, wherein the first and second heights are compressed with an upper die.

6. The method according to claim 5, wherein forming the sliding face comprises closing pores in the sliding face.

7. The method according to claim 6, wherein closing comprises closing the pores in the sliding face with a rod.

8. The method according to claim 6, wherein closing comprises closing the pores in the sliding face with the face of a rod.

9. The method according to claim 6, wherein closing comprises closing the pores in the sliding face with a roughened face of a rod.

10. The method according to claim 6, wherein closing comprises closing the pores in the sliding face by moving the rod along an axis.

* * * * *